US011876316B2

(12) United States Patent
Brown

(10) Patent No.: US 11,876,316 B2
(45) Date of Patent: Jan. 16, 2024

(54) CONNECTOR HAVING A HOUSING WITH A WINDOW

(71) Applicant: TE Connectivity Services GmbH, Schaffhausen (CH)

(72) Inventor: Michael Dale Brown, Winston Salem, NC (US)

(73) Assignee: TE Connectivity Solutions GmbH

( * ) Notice: Subject to any disclaimer, the term of this patent is extended or adjusted under 35 U.S.C. 154(b) by 21 days.

(21) Appl. No.: 17/563,455

(22) Filed: Dec. 28, 2021

(65) Prior Publication Data

US 2023/0208061 A1 Jun. 29, 2023

(51) Int. Cl.
*H01R 12/77* (2011.01)

(52) U.S. Cl.
CPC .................................. *H01R 12/771* (2013.01)

(58) Field of Classification Search
None
See application file for complete search history.

(56) References Cited

U.S. PATENT DOCUMENTS

| | | | | |
|---|---|---|---|---|
| 7,201,605 | B2 * | 4/2007 | Yamada | H01R 12/88 439/495 |
| 7,722,373 | B2 * | 5/2010 | Nemoto | H01R 12/89 439/325 |
| 10,355,385 | B1 * | 7/2019 | Bulmer | H01R 12/88 |
| 10,439,312 | B2 * | 10/2019 | Takane | H01R 13/627 |

* cited by examiner

*Primary Examiner* — Ross N Gushi

(57) ABSTRACT

A connector includes a housing having a contact receiving passageway extending through a mating end of the housing in a longitudinal direction and a contact disposed in the contact receiving passageway. The housing has a window extending through a wall of the housing in a direction perpendicular to the longitudinal direction. The contact has a mating section disposed at the mating end and a contact section extending from the mating section. An exposed portion of the contact section is exposed to an area exterior of the housing through the window.

19 Claims, 6 Drawing Sheets

CONNECTOR HAVING A HOUSING WITH A WINDOW

FIELD OF THE INVENTION

The present invention relates to a connector and, more particularly, to a housing of the connector having a window.

BACKGROUND

A connector commonly includes a housing and a plurality of contacts disposed in the housing. To connect a cable with the connector, the cable can be inserted into the housing and into electrical and mechanical contact with the contacts that are held within the housing. During insertion of the cable into the housing, however, it is often difficult for the user to ensure that the cable has been fully inserted to a proper depth to connect with the contacts. Under-insertion of the cable can lead to improper electrical connection with the contacts, which can lead to unreliable and poor connector performance.

SUMMARY

A connector includes a housing having a contact receiving passageway extending through a mating end of the housing in a longitudinal direction and a contact disposed in the contact receiving passageway. The housing has a window extending through a wall of the housing in a direction perpendicular to the longitudinal direction. The contact has a mating section disposed at the mating end and a contact section extending from the mating section. An exposed portion of the contact section is exposed to an area exterior of the housing through the window.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
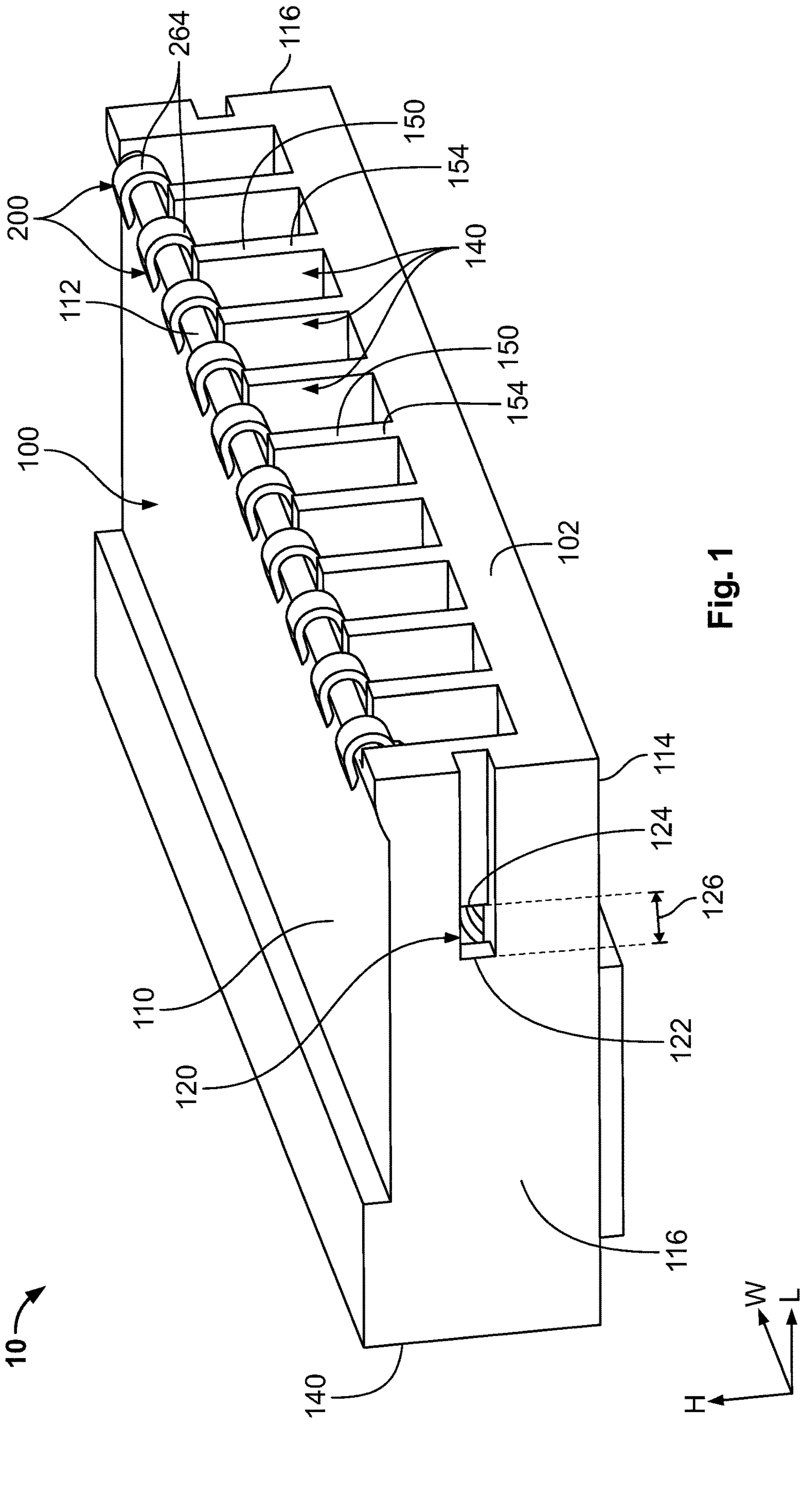
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "height". These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

Figure 2:
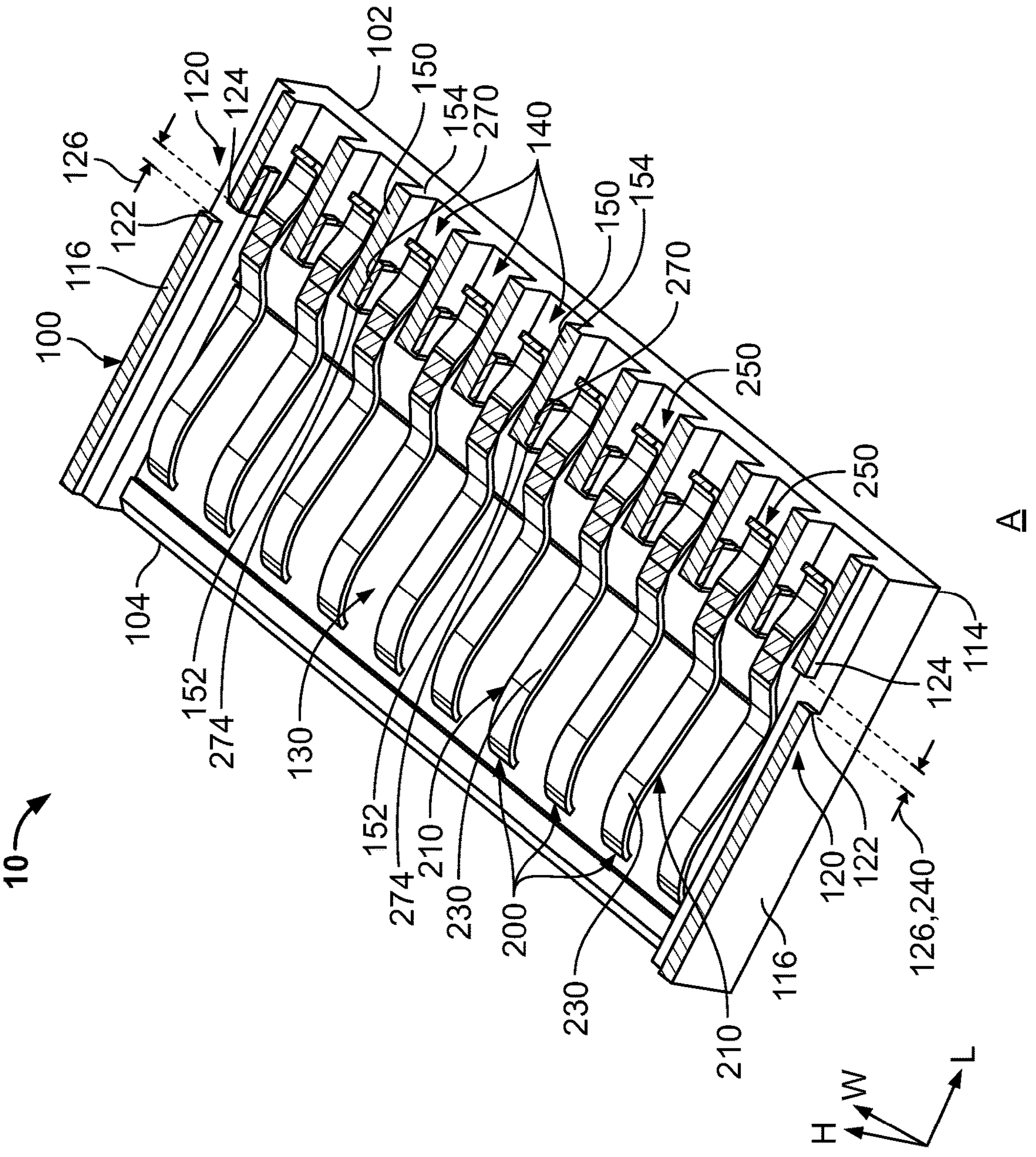
FIG. 2 is a sectional perspective view of the connector.

A connector 10 according to an embodiment, as shown in FIGS. 1 and 2, includes a housing 100 and a plurality of contacts 200 disposed in the housing 100.

The housing 100, as shown in FIGS. 1 and 2, has a mating end 102 and a cable end 104 opposite the mating end 102 in a longitudinal direction L. The housing 100 has an upper wall 110 and a lower wall 114 opposite the upper wall 110 in a height direction H perpendicular to the longitudinal direction L. As shown in FIG. 1, the upper wall 110 has a front lip 112 where the upper wall 110 meets the mating end 102. The housing 100 has a pair of side walls 116 extending from the mating end 102 to the cable end 104 along the longitudinal direction L and extending between the upper wall 110 and the lower wall 114 along the height direction H. The upper wall 110, the lower wall 114, and the side walls 116 define a cable receiving space 130, shown in FIG. 2.

In the embodiment shown in FIGS. 1 and 2, each of the side walls 116 has a window 120 extending through the side wall 116 in a width direction W perpendicular to the longitudinal direction L. The window 120 extends from a first window end 122 to a second window end 124 along the longitudinal direction L and has a window length 126 along the longitudinal direction L. The window 120 is spaced apart from the mating end 102 along the longitudinal direction L.

The window 120, in the embodiment shown in FIGS. 1 and 2, is an approximately rectangular opening in the side wall 116. In other embodiments, the window 120 could have a square shape, a circular shape, an oval shape, or any other shape of opening provided that the window 120 extends from the first window end 122 to the second window end 124 along the longitudinal direction L and allows the visibility through the window 120 described in greater detail below.

The housing 100, in the embodiment shown in FIGS. 1 and 2, has one window 120 in each of the side walls 116. In other embodiments, the window 120 could extend through at least one of the upper wall 110 and the lower wall 114 along the height direction H, or could extend in any number through any combination of the side walls 116, the upper wall 110, and the lower wall 114; in all embodiments, at least one window 120 extends through at least one of the walls 110, 114, 116 from the first window end 122 to the second window end 124 at a position spaced apart from the mating end 102 along the longitudinal direction L.

As shown in FIGS. 1 and 2, the housing 100 has a plurality of contact receiving passageways 140 extending through the mating end 102 in the longitudinal direction L and communicating with the cable receiving space 130. The contact receiving passageways 140 are separated from one another in the width direction W by a plurality of partitions 150. In the shown embodiment, the housing 100 has ten contact receiving passageways 140 and nine partitions 150 separating the contact receiving passageways 140 along the width direction W between the side walls 116. In other embodiments, the housing 100 could have any number of contact receiving passageways 140 greater than or equal to two, and at least one partition 150 separating each pair of adjacent contact receiving passageways 140.

Each of the partitions 150, as shown in FIGS. 1 and 2, extends from a first partition end 152 to a second partition end 154 along the longitudinal direction L. The first partition end 152 faces the cable receiving space 130 and is disposed adjacent to the cable receiving space 130 along the longitudinal direction L. The second partition end 154 is aligned with the mating end 102 of the housing 100.

The housing 100 is formed of an insulative material, such as a plastic. In an embodiment, the housing 100 is monolithically formed in a single piece from the insulative material. In other embodiments, the housing 100 could be formed from a plurality of pieces and assembled together to form the elements of the housing 100 described above.

Figure 3:
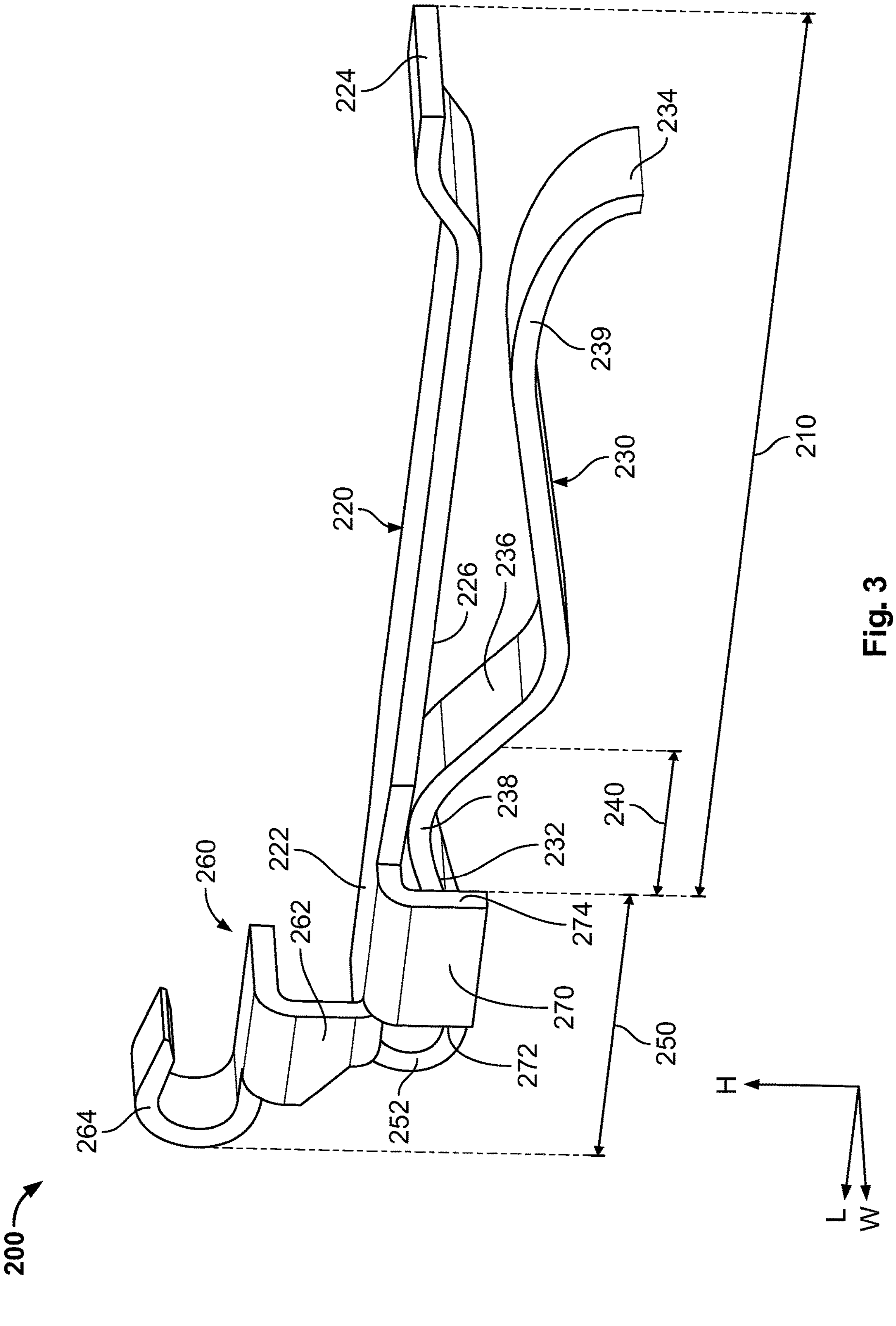
FIG. 3 is a perspective view of a contact of the connector.

One of the plurality of contacts 200 is shown in detail in FIG. 3. The contact 200, as shown in FIG. 3, has a mating section 250 and a contact section 210 extending from the mating section 250 along the longitudinal direction L.

In the contact section 210, as shown in FIG. 3, the contact 200 has a first beam 220 and a second beam 230 that is resiliently deflectable with respect to the first beam 220. The first beam 220 extends from a first connected end 222 to a first free end 224 opposite the first connected end 222 along the longitudinal direction L. The first beam 220 has a first contact surface 226 facing the second beam 230 along the height direction H.

As shown in FIG. 3, the second beam 230 extends from a second connected end 232 to a second free end 234 along the longitudinal direction L. The second beam 230 has a second contact surface 236 facing the first contact surface 226 along the height direction H. The second beam 230 has a first contact bend 238 and a second contact bend 239 between the second connected end 232 and the second free end 234. The first contact bend 238 and the second contact bend 239 are each bent toward the first beam 220 in the height direction H.

In the mating section 250, as shown in FIG. 3, the contact 200 has a curved portion 252 to which the first connected end 222 of the first beam 220 and the second connected end 232 of the second beam 230 are attached. The second beam 230 is deflectable about the curved portion 252 with respect to the first beam 200.

As shown in FIG. 3, the contact 200 has a clip portion 260 in the mating section 250 extending from the curved portion 252. The clip portion 260 has an arm 262 attached to and extending from the curved portion 252 along the height direction H and a hook 264 disposed at an end of the arm 262 opposite the curved portion 252.

The contact 200 has a flange 270 in the mating section 250 adjacent to the clip portion 260 along the longitudinal direction L and extending from the first beam 220, as shown in FIG. 3. The flange 270 is bent perpendicular to the first beam 220. The flange 270 has a connection end 272 and an insertion end 274 opposite the connection end 272 along the longitudinal direction L. In another embodiment, the flange 270 could extend from the second beam 230 and be bent perpendicular to the second beam 230.

The contact 200 is formed of a conductive material, such as copper or aluminum. In the shown embodiment, the contact 200 is monolithically formed in a single piece from the conductive material. In other embodiments, the contact 200 could be formed from a plurality of pieces and assembled together to form the elements of the contact 200 described above.

To assemble the connector 10, the contacts 200 are inserted into the housing 100 as shown in FIGS. 1 and 2. Each of the contacts 200 is inserted into one of the contact receiving passageways 140; the number of contacts 200 varies in different embodiments but is equal to the number of contact receiving passageways 140.

As shown in FIG. 2, the mating section 250 of each of the contacts 200 is disposed at the mating end 102 of the housing 100 and the contact section 210 extends from the mating section 250 into the cable receiving space 130 along the longitudinal direction L. The clip portion 260 extends out of the contact receiving passageway 140 and engages the mating end 102 of the housing 100 to secure the contact 200 in the contact receiving passageway 140; the hook 264 of the clip portion 260 engages the front lip 112, as shown in FIG. 1. As shown in FIG. 2, the insertion end 274 of the flange 270 is aligned with the first partition end 152 of the adjacent partition 150 along the longitudinal direction L. An exposed portion 240 of the contact section 210, shown in FIG. 3, is exposed to an area A exterior of the housing 100 through the window 120, as shown in FIG. 2.

Figure 4:
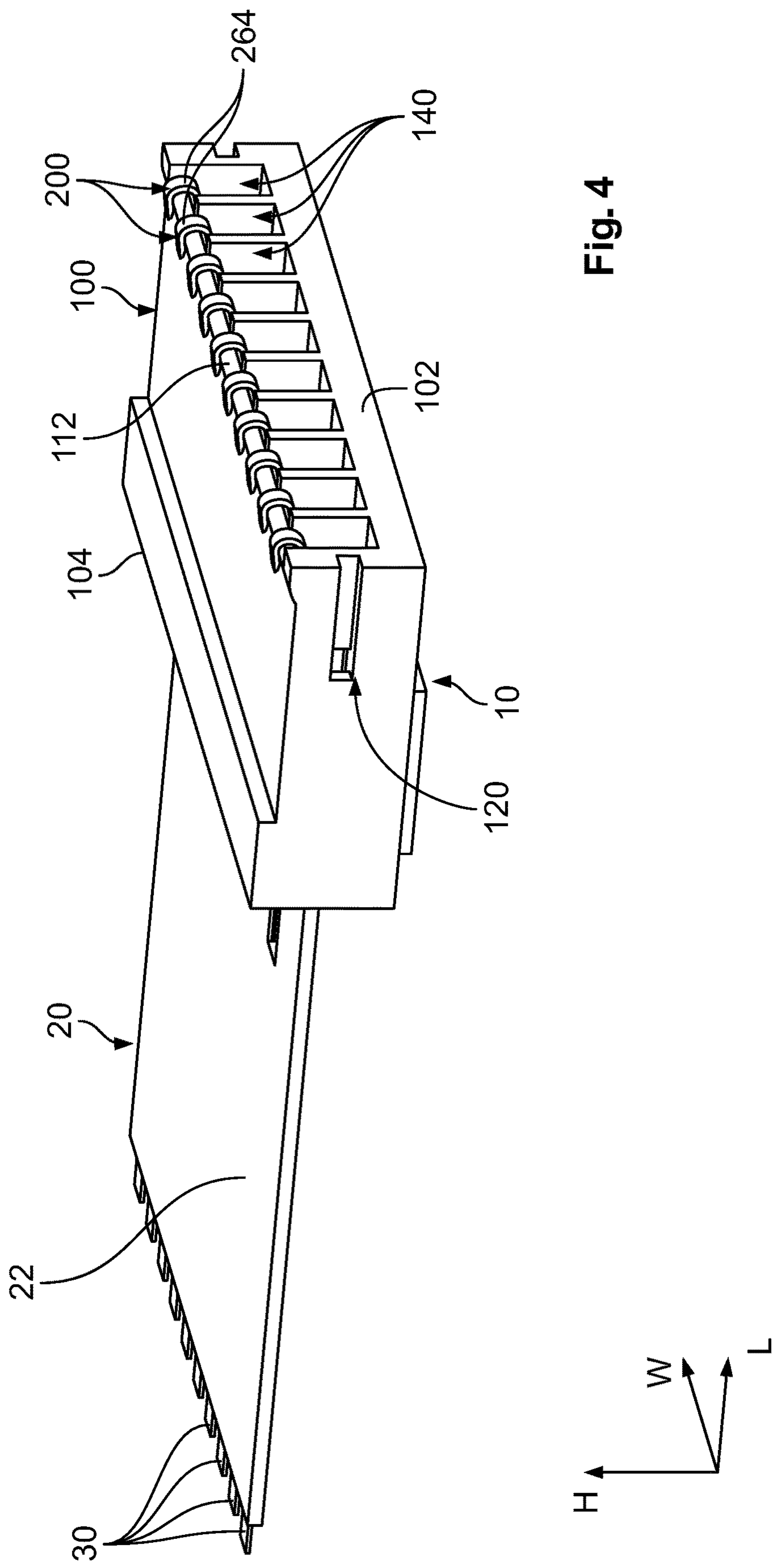
FIG. 4 is a perspective view of a connector assembly according to an embodiment.
Figure 5:
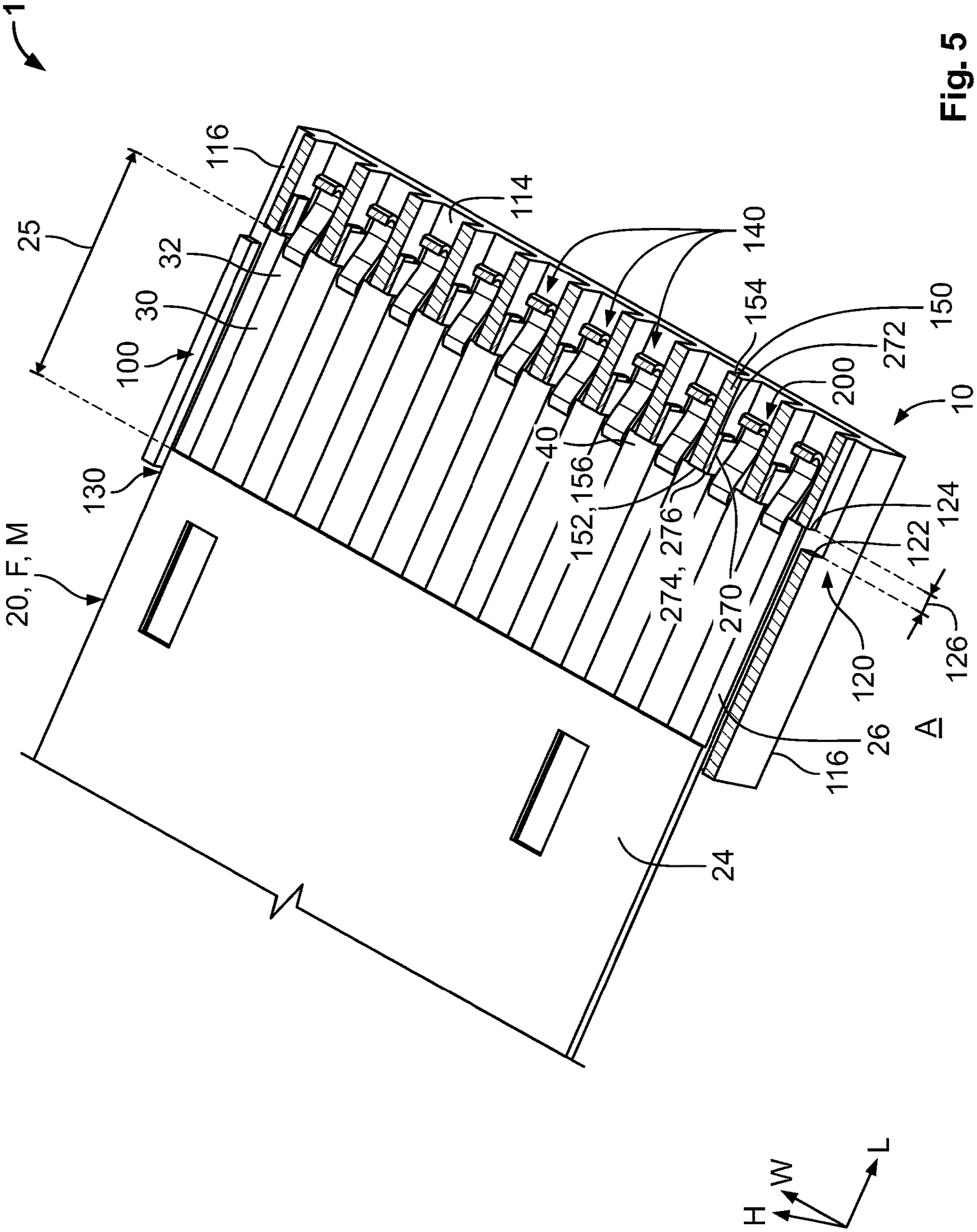
FIG. 5 is a sectional perspective view of the connector assembly.
Figure 6:
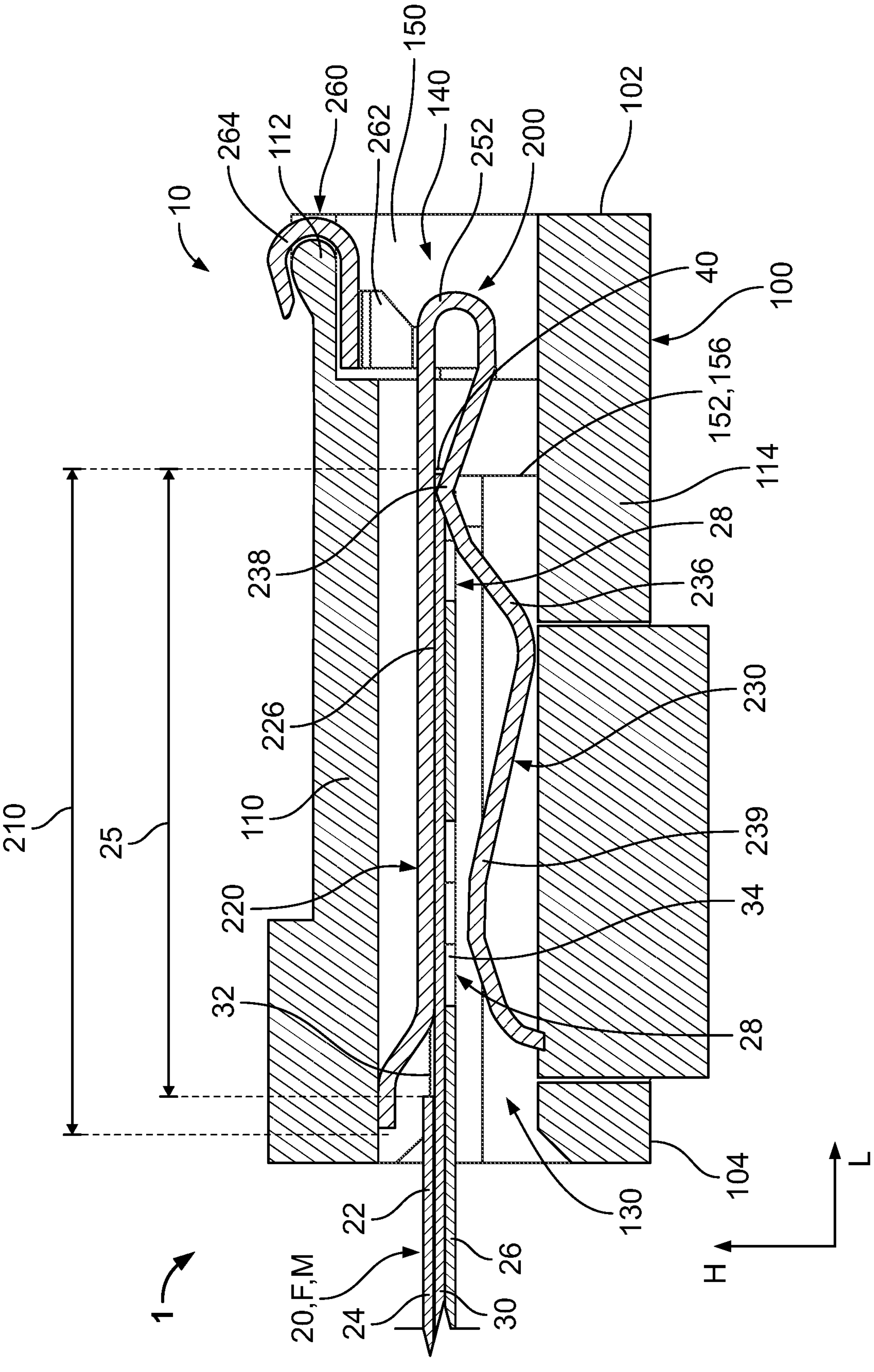
FIG. 6 is a sectional side view of the connector assembly.

A connector assembly 1 according to an embodiment is shown in FIGS. 4-6. The connector assembly 1 includes the connector 10 described in detail above with respect to the embodiment of FIGS. 1-3 and a cable 20 disposed in the connector 10.

In the embodiment shown in FIGS. 4-6, the cable 20 is a flat flexible cable with an insulation material 22 and a plurality of flat conductors 30 embedded in the insulation material 22. In an embodiment, the flat conductors 30 are each a metallic foil, such as a copper foil, by way of example only, patterned in any desirable configuration. The flat conductors 30 may also be referred to as conductors 30 herein. As shown in FIGS. 5 and 6, the conductors 30 each have a first side 32 and a second side 34 opposite the first side 32 in the height direction H.

The insulation material 22, such as a polymer insulation material, may be applied to either or both of the first side 32 and the second side 34 via an adhesive material or extruded directly over the conductors 30. The insulation material 22, as shown in FIGS. 5 and 6, has an upper side 24 and a lower side 26 opposite the upper side 24 in the height direction H. The conductors 30 are embedded in the insulation material 22 between the upper side 24 and the lower side 26.

As shown in the embodiment of FIGS. 5 and 6, the cable 20 has a stripped section 25 at an insertion end 40 of the cable 20. The upper side 24 of the insulation material 22 is removed in the stripped section 25, exposing the first side 32 of each of the conductors 30.

As shown in FIG. 6, the lower side 26 of the insulation material 22 has a plurality of openings 28 extending through the lower side 26. Each of the openings 28 exposes a portion of the second side 34 of one of the conductors 30. In the shown embodiment, each pair of openings 28 of the plurality of openings 28 are aligned along the longitudinal direction L with one of the conductors 30 and expose different portions of the second side 34 of the conductor 30 that are spaced apart from one another along the longitudinal direction L. In other embodiments, only one opening 28 may be associated with each of the conductors 30 or more than two openings 28 may be associated with each of the conductors 30 and aligned along the longitudinal direction L.

The insertion of the cable 20 into the connector 10 to form the connector assembly 1 will now be described in greater detail primarily with respect to FIGS. 5 and 6.

As shown in FIGS. 5 and 6, the insertion end 40 of the cable 20 is inserted into the cable receiving space 130 along the longitudinal direction L. The cable 20 is inserted with the first side 32 of the conductors 30 facing the upper wall 110 and the second side 34 of the conductors 30 facing the lower wall 114. The cable 20, as shown in FIG. 6, is inserted between the first beam 220 and the second beam 230 of each of the contacts 200 into the contact section 210 of the contacts 200.

Inserting the cable 20 into the cable receiving space 130 to the proper depth along the longitudinal direction L, a fully inserted position F of the cable 20, ensures that the cable 20 can properly electrically and mechanically connect with each of the contacts 200. The fully inserted position F is one of a plurality of positions between a minimum inserted position and a maximum inserted position M of the cable 20 into the connector 10 and the contacts 200 along the longitudinal direction L; the cable 20 is capable of forming a complete electrical and mechanical connection with the contacts 200 in the contact section 210 in all fully inserted positions F between the minimum inserted position and the maximum inserted position M along the longitudinal direction L. The minimum inserted position and the maximum inserted position M of the fully inserted positions F are spaced apart from one another along the longitudinal direction L.

The cable 20 is inserted into the cable receiving space 130 along the longitudinal direction L until the insertion end 40 is visible from the area A exterior of the housing 100 through the window 120, as shown in FIG. 5. The insertion end 40 is visible through the window 120 when the cable 20 is in one of the fully inserted positions F in the contacts 200. When the insertion end 40 of the cable 20 is first visible at the first window end 122 during insertion of the cable 20 along the longitudinal direction L, the cable 20 is in the minimum inserted position in the contacts 200. When the insertion end 40 reaches the second window end 124 along the longitudinal direction L, the cable 20 is at the maximum inserted position M in the contacts 200, as shown in FIG. 5. The insertion end 40 is visible through the window 120 in all of the fully inserted positions F and the window length 126 corresponds to a distance along the longitudinal direction L between the minimum inserted position and the maximum inserted position M. The window 120 can be used by a user to verify that the cable 20 is inserted to the fully inserted position F within the contacts 200 that will allow for a proper mechanical and electrical connection.

In an embodiment, the maximum inserted position M of the cable 20 in the connector 10 is also indicated to the user through one or more stops 156, 276 formed by the connector 10. When the insertion end 40 of the cable 20 reaches the maximum inserted position M, as shown in FIG. 5, the insertion end 40 abuts the first partition end 152 of each of the partitions 150. The first partition end 152 serves as a stop 156 that abuts the insertion end 40 and prevents further insertion of the cable 20 along the longitudinal direction L. In the shown embodiment, the insertion end 274 of the flange 270 aligned with the first partition end 152 also serves as a stop 276 that abuts the insertion end 40 and prevents further insertion of the cable 20 along the longitudinal direction L. In another embodiment, the first partition end 152 is the only stop 156 of the connector 10 and the flange 270 is omitted from the contacts 200. In another embodiment, the insertion end 40 does not reach the first partition end 152 in the maximum inserted position M and the insertion end 274 of the flange 170 is the only stop 276 at the maximum inserted position M of the cable 20.

As shown in FIG. 6, in all of the fully inserted positions F, the first side 32 of each of the conductors 30 abuts and electrically connects with the first beam 220 of one of the contacts 200 in the stripped section 25 of the cable 20. The second side 34 of each of the conductors 30 abuts and electrically connects with the second beam 230 of the one of the contacts 200. In the shown embodiment, the first contact bend 238 of the second beam 230 is aligned with one of the openings 28 and the second contact bend 239 is aligned with another of the openings 28 in the lower side 26 of the insulation material 22. The first contact bend 238 and the second contact bend 239 abut and electrically connect with the second side 34 of the conductors 30 through the openings 38.

In another embodiment, the cable 20 may be a flexible printed circuit instead of a flexible printed cable, in which the conductors 30 and optionally also the insulation material 22 are disposed on a flexible backplane. The cable 20 embodied as the flexible printed circuit otherwise functions similarly to the cable 20 embodied as the flat flexible cable shown herein and described in detail above in insertion into the connector 10 along the longitudinal direction L to the fully inserted position F, and in the electrical and mechanical connection with the contacts 200.

In another embodiment, the cable 20 may be a plurality of individual wires each having one conductor 30, formed in a flat or round shape, surrounded by the insulation material 22 and separate from the insulation material 22 of the other wires. The insertion of the cable 20 formed as a plurality of wires into the connector 10, including the locating and verification of the fully inserted position F along the longitudinal direction L, functions similarly to the insertion of the cable 20 embodied as the flat flexible cable described above. Each of the wires of the cable 20 of this embodiment individually reach the fully inserted position F as described above and each individually electrically and mechanically connect with one of the contacts 200.

What is claimed is:

1. A connector, comprising:

a housing having a contact receiving passageway extending through a mating end of the housing in a longitudinal direction and a window extending through a wall of the housing in a direction perpendicular to the longitudinal direction; and a contact disposed in the contact receiving passageway, the contact having:

a mating section disposed at the mating end and including a flange bent perpendicular to a beam of the contract;

a clip portion in the mating section disposed adjacent to the flange along the longitudinal direction, the clip portion extends out of the contact receiving passageway and engages the mating end of the housing; and a contact section extending from the mating section, an exposed portion of the contact section is exposed to an area exterior of the housing through the window.

2. The connector of claim 1, wherein the window extends from a first window end to a second window end along the longitudinal direction, the window is spaced apart from the mating end along the longitudinal direction.

3. The connector of claim 1, wherein the window extends through a side wall of the housing.

4. The connector of claim 1, wherein the contact receiving passageway is one of a plurality of contact receiving passageways extending through the mating end of the housing in the longitudinal direction, the contact receiving passageways are separated from one another in a width direction perpendicular to the longitudinal direction by a partition.

5. The connector of claim 4, wherein the partition forms a stop at an end of the partition facing a cable receiving space of the housing in the longitudinal direction.

6. The connector of claim 1, wherein the contact has a first beam and a second beam in the contact section.

7. A connector assembly, comprising:
a connector including a housing having a contact receiving passageway extending through a mating end of the housing in a longitudinal direction and a contact disposed in the contact receiving passageway, the housing has a window extending through a lateral side wall of the housing in a width direction perpendicular to the longitudinal direction, the contact has:
a mating section disposed at the mating end;
a flange in the mating section, the flange bent perpendicular to a beam of the contact; and
a contact section extending from the mating section; and
a cable disposed in the housing, the cable has an insertion end disposed in the contact section and includes a lateral edge visible from an area exterior of the housing through the window after the cable is in a fully inserted position in the contact, the fully inserted position is one of a plurality of positions between a minimum inserted position and a maximum inserted position of the cable along the longitudinal direction, the cable is capable of forming a complete electrical and mechanical connection with the contact section in all fully inserted positions between the minimum inserted position and the maximum inserted position, the cable abuts an end of the flange in the maximum inserted position.

8. The connector assembly of claim 7, wherein the window extends from a first window end to a second window end along the longitudinal direction, the first window end exposing the minimum inserted position and the second window end exposing the maximum inserted position.

9. The connector assembly of claim 7, wherein the contact receiving passageway is one of a plurality of contact receiving passageways extending through the mating end of the housing in the longitudinal direction, the contact receiving passageways are separated from one another in a width direction perpendicular to the longitudinal direction by a partition.

10. The connector assembly of claim 9, wherein the partition forms a stop at an end of the partition, the cable abuts the stop in the maximum inserted position.

11. The connector assembly of claim 7, wherein the cable is a flat flexible cable having a flat conductor disposed within an insulation material.

12. A connector assembly, comprising:
a connector including a housing having:
a plurality of contact receiving passageways extending through a mating end of the housing in a longitudinal direction, the plurality of contact receiving passageways arranged in a row extending in a lateral direction of the housing perpendicular to the longitudinal direction; and
a window extending through a lateral side wall of the housing in the lateral direction;
a plurality of contacts disposed in the contact receiving passageways, the contacts each having a mating section disposed at the mating end and a contact section extending from the mating section; and
a cable disposed in the housing, the cable has an insertion end disposed in the contact section and abutting a stop of the connector when the cable is in a fully inserted position in the contact, the stop of the connector aligned with the window in the longitudinal direction.

13. The connector assembly of claim 12, wherein the contact receiving passageway is one of a plurality of contact receiving passageways extending through the mating end of the housing in the longitudinal direction, the contact receiving passageways are separated from one another in a width direction perpendicular to the longitudinal direction by a partition.

14. The connector assembly of claim 13, wherein the partition has an end forming the stop.

15. The connector assembly of claim 12, wherein the contact has a flange in the mating section forming the stop.

16. A connector, comprising:
a housing having:
a plurality of contact receiving passageways extending through a mating end of the housing in a longitudinal direction, the plurality of contact receiving passageways arranged in a row extending in a lateral direction of the housing perpendicular to the longitudinal direction; and
a window extending through each of two lateral side walls of the housing in the lateral direction; and
a plurality of contacts disposed in the contact receiving passageways, the contacts each having a mating section disposed at the mating end and a contact section extending from the mating section, an exposed portion of the contact section is exposed to an area exterior of the housing through the window.

17. The connector assembly of claim 12, wherein:
the fully inserted position is one of a plurality of positions between a minimum inserted position and a maximum inserted position of the cable along the longitudinal direction, the cable is capable of forming a complete electrical and mechanical connection with the contact section in all fully inserted positions between the minimum inserted position and the maximum inserted position; and
the cable abuts the stop in the maximum inserted position.

18. The connector assembly of claim 12, wherein the each of the contacts has a first beam and a second beam defining respective contact surfaces opposing one another in a height direction of the housing, the window aligned with the contact surfaces of at least one of the plurality of contacts in the longitudinal direction such that the contact surfaces are visible through the opening in the lateral direction.

19. The connector assembly of claim 18, wherein the window is aligned with the contact surfaces of the at least one of the plurality of contacts in the height direction.

* * * * *